US010637158B2

(12) United States Patent
Zou et al.

(10) Patent No.: US 10,637,158 B2
(45) Date of Patent: Apr. 28, 2020

(54) PHASED ARRAY CALIBRATION METHOD AND PHASED ARRAY CALIBRATION CIRCUIT

(71) Applicant: Huawei Technologies Co., Ltd., Shenzhen, Guangdong (CN)

(72) Inventors: Xiongfei Zou, Chengdu (CN); Hua Cai, Chengdu (CN); Jie Cao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 705 days.

(21) Appl. No.: 15/343,912

(22) Filed: Nov. 4, 2016

(65) Prior Publication Data

US 2017/0077611 A1 Mar. 16, 2017

Related U.S. Application Data

(63) Continuation of application No. PCT/CN2014/076971, filed on May 7, 2014.

(51) Int. Cl.
*H04B 17/00* (2015.01)
*H01Q 21/22* (2006.01)
(Continued)

(52) U.S. Cl.
CPC ............... *H01Q 21/22* (2013.01); *H01Q 3/26* (2013.01); *H01Q 3/267* (2013.01); *H01Q 3/28* (2013.01); *H01Q 3/30* (2013.01)

(58) Field of Classification Search
CPC .......... H01Q 21/22; H01Q 3/26; H01Q 3/267; H01Q 3/28; H01Q 3/30
See application file for complete search history.

(56) References Cited

U.S. PATENT DOCUMENTS 5,162,803 A 11/1992 Chen
6,720,919 B1 * 4/2004 Sinsky .................. H01Q 3/267
342/174

(Continued)

FOREIGN PATENT DOCUMENTS

| | | |
|---|---|---|
| CN | 102385053 A | 3/2012 |
| CN | 102955155 A | 3/2013 |
| CN | 103022698 A | 4/2013 |

OTHER PUBLICATIONS

Cameron T. Charles, "A Calibrated Phase and Amplitude Control System for Phased-Array Transmitters", University of Washington, 2006, 173 pages.

(Continued)

*Primary Examiner* — Nhan T Le
(74) *Attorney, Agent, or Firm* — Leydig, Voit & Mayer, Ltd.

(57) ABSTRACT

The present invention relates to the communications field, and provides a phased array calibration method and a phased array calibration circuit. The phased array calibration circuit includes a signal obtaining module, a selector, a phase difference module, and a main signal module. The selector is configured to switch on the signal obtaining module and the main signal module; the signal obtaining module is configured to obtain a first signal according to an initial signal after the selector switches on the signal obtaining module and the main signal module; the selector is further configured to switch on the phase difference module, the signal obtaining module, and the main signal module; and the signal obtaining module is further configured to obtain a second signal according to the initial signal after the selector switches on the phase difference module, the signal obtaining module, and the main signal obtaining module.

11 Claims, 6 Drawing Sheets

(51) Int. Cl.

| | |
|---|---|
| ***H01Q 3/26*** | (2006.01) |
| ***H01Q 3/30*** | (2006.01) |
| ***H01Q 3/28*** | (2006.01) |

(56) References Cited

U.S. PATENT DOCUMENTS

| | | | | |
|---|---|---|---|---|
| 2005/0272392 | A1 | 12/2005 | Richardson | |
| 2012/0050094 | A1 | 3/2012 | Nakabayashi et al. | |
| 2012/0293362 | A1 * | 11/2012 | Liang .................. | H01Q 3/2605 342/174 |
| 2013/0079060 | A1 | 3/2013 | Pivit et al. | |

OTHER PUBLICATIONS

Ozgur Inac et al., "A 90-100-GHz Phased-Array Transmit/Receive Silicon RFIC Module With Built-In Self-Test", IEEE Transactions on Microwave Theory and Techniques, vol. 61, No. 10, Oct. 2013, pp. 3774-3782.

* cited by examiner

PHASED ARRAY CALIBRATION METHOD AND PHASED ARRAY CALIBRATION CIRCUIT

CROSS-REFERENCE TO RELATED APPLICATIONS

This application is a continuation of International Application No. PCT/CN2014/076971, filed on May 7, 2014, the disclosure of which is hereby incorporated by reference in its entirety.

TECHNICAL FIELD

The present invention relates to the communications field, and in particular, to a phased array calibration method and a phased array calibration circuit.

BACKGROUND

Factors such as an ambient temperature and component aging may cause an error to a phase and an amplitude of a signal in a phased array system, causing a change in a signal beam direction, a decrease in an antenna gain, and the like. Therefore, a phased array needs to be calibrated, that is, the phase and the amplitude of the signal in the system need to be calibrated.

There is a phased array calibration method in the prior art, which can be used to calibrate a phase and an amplitude of a signal of a transceiver in a phased array system but has a complex circuit and very high costs.

SUMMARY

Embodiments of the present invention provide a phased array calibration method and a phased array calibration circuit, where a circuit structure is simple and costs are relatively low.

To achieve the foregoing objective, the following technical solutions are used in the embodiments of the present invention:

According to a first aspect, a phased array calibration circuit is disclosed, including: a signal obtaining module, a selector, a phase difference module, and a main signal module, where the selector is configured to switch on the signal obtaining module and the main signal module;

the signal obtaining module is configured to obtain a first signal according to an initial signal after the selector switches on the signal obtaining module and the main signal module;

the selector is further configured to switch on the phase difference module, the signal obtaining module, and the main signal module; and the signal obtaining module is further configured to obtain a second signal according to the initial signal after the selector switches on the phase difference module, the signal obtaining module, and the main signal module, so as to obtain a phase error and an amplitude error of a phased array channel in the main signal module according to phase information and amplitude information of the first signal and phase information and amplitude information of the second signal.

According to a second aspect, a phased array calibration method is disclosed, used in a circuit that implements phased array calibration by using a parametric amplifier, where a gain increment of the parametric amplifier uniquely corresponds to two gain values and two phase values, and the method includes:

obtaining a first signal by using an initial signal, and recording first phase information and first amplitude information of the first signal;

obtaining a second signal after setting a phase shift for the initial signal, and recording first phase information and first amplitude information of the second signal;

comparing the amplitude information of the first signal with the amplitude information of the second signal to obtain a gain increment, and obtaining original phase information and original amplitude information of the first signal and original phase information and original amplitude information of the second signal according to the gain increment;

using either of the first signal and the second signal as a reference signal, and obtaining a phase error of a phased array channel according to first phase information of the reference signal and original phase information of the reference signal; and obtaining an amplitude error of the phased array channel according to first amplitude information of the reference signal and original amplitude information of the reference signal.

The phased array calibration method and the phased array calibration circuit provided in the present invention can be applied to calibration of a large-scale phased array. Extraction of an amplitude error and a phase error of the phased array is implemented based on a parametric amplifier, so as to calibrate and recover a main channel signal in a relatively accurate manner. Compared with a calibration circuit in the prior art, the calibration circuit provided in the present invention has a lower circuit complexity degree, is simple and is easy to implement, and has relatively low costs.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
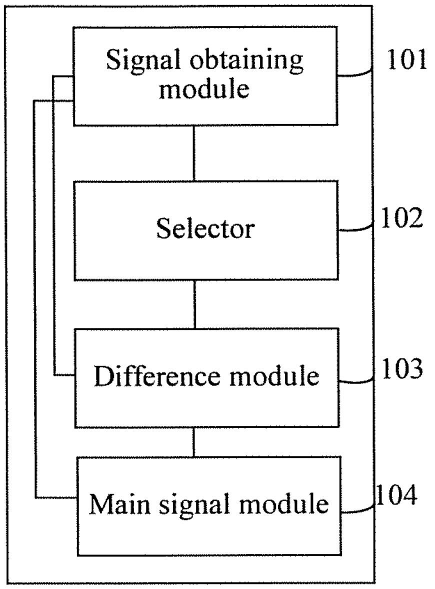
FIG. 1 is a structural block diagram of a phased array calibration circuit according to Embodiment 1 of the present invention.

This embodiment of the present invention provides a phased array calibration circuit. As shown in FIG. 1, the phased array circuit includes: a signal obtaining module 101, a selector 102, a phase difference module 103, and a main signal module 104.

The selector 102 is configured to switch on the signal obtaining module 101 and the main signal module 104.

The signal obtaining module 101 is configured to obtain a first signal according to an initial signal after the selector 102 switches on the signal obtaining module 101 and the main signal module 104.

The selector 102 is further configured to switch on the phase difference module 103, the signal obtaining module 101, and the main signal module 104.

The signal obtaining module 101 is further configured to obtain a second signal according to the initial signal after the selector 102 switches on the phase difference module 103, the signal obtaining module 101, and the main signal module 104, so as to obtain a phase error and an amplitude error of a phased array channel in the main signal module according to phase information and amplitude information of the first signal and phase information and amplitude information of the second signal.

Herein, it should be noted that the phase difference module 103, the signal obtaining module, and the main signal module 104 are in communication by using the selector 102. Therefore, when the selector 102 selects to switch on the signal obtaining module 101 and the main signal module 104, only the signal obtaining module 101 and the main signal module 104 in the phased array calibration circuit are in a working state. The signal obtaining module 101, the phase difference module 103, and the main signal module 104 in the phased array calibration circuit are all in a working state only when the selector 102 selects to switch on the phase difference module 103, the signal obtaining module 101, and the main signal module 104, and in this case, the calibration circuit is in a calibration state.

Figure 2:
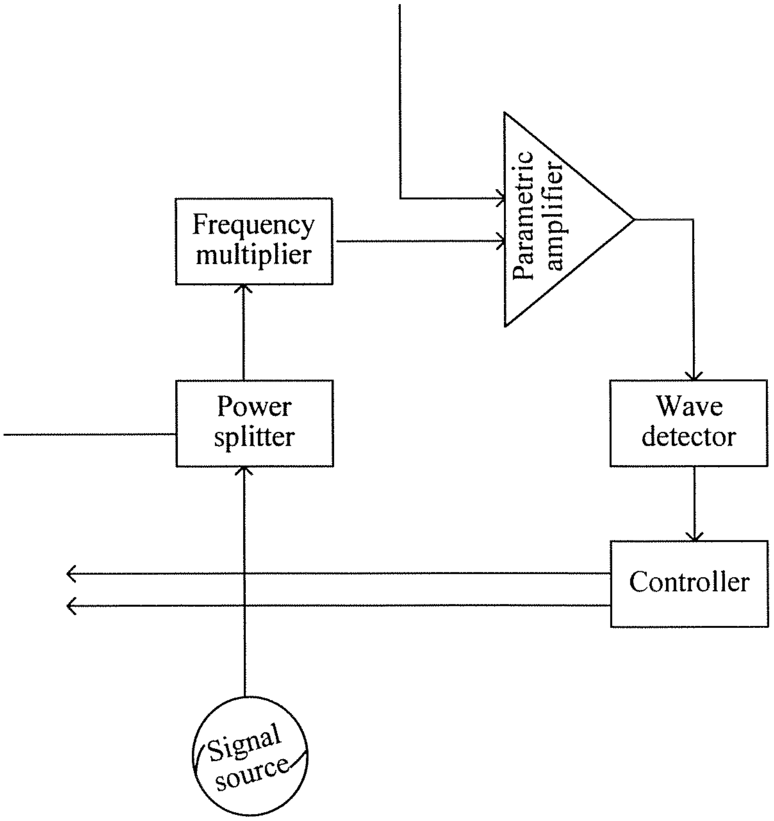
FIG. 2 is a schematic diagram of circuit composition of a signal obtaining module according to Embodiment 1 of the present invention.

As shown in FIG. 2, the signal obtaining module includes a parametric amplifier, a wave detector, a processor, a controller, a signal generator, a power splitter, and a frequency multiplier. The devices are connected in the following manner: the signal generator includes a signal output end, where the signal output end is connected to an input end of the power splitter; the power splitter includes the input end, a first output end, and a second output end, where the first output end is connected to an input end of the frequency multiplier; the parametric amplifier includes a first input end, a second input end, and an output end, where the first input end is connected to an output end of the frequency multiplier, and the output end is connected to an input end of the wave detector; an input end of the processor is connected to an output end of the wave detector, an output end of the processor is connected to an input end of the controller, and an output end of the controller is connected to the phased array.

Figure 3:
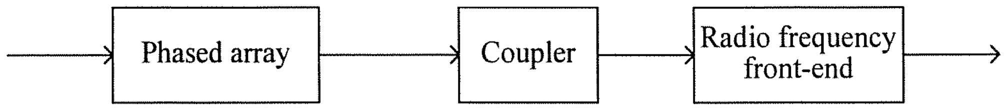
FIG. 3 is a schematic diagram of circuit composition of a main signal module according to Embodiment 1 of the present invention.

As shown in FIG. 3, the main signal module includes: the phased array, a coupler, and a radio frequency front-end. The devices are connected in the following manner: the phased array is connected to an input end of the coupler, an output end of the coupler is connected to an input end of the radio frequency front-end, and an output end of the radio frequency front-end is an output end of the main signal module 104.

It should be noted that a gain of the parametric amplifier is not fixed and is adjusted by a phase between two input signals. A gain increment (that is, a difference between gains of two amplifications) at the parametric amplifier uniquely corresponds to two gains. The wave detector is configured to extract amplitude strength of an input signal and recover the signal from an amplitude wave. The processor is configured to process a calibration signal, and the controller is configured to control a phase shifter of the phased array to calibrate a phase error and an amplitude error of a channel. The signal generator is configured to generate the initial signal. The power splitter is configured to split an input signal into two or more output signals having equal or unequal transmission powers, and a sum of powers of all the output signals is equal to a power of the input signal. The frequency multiplier is configured to multiply a frequency of an input signal, so that a frequency of an output signal is equal to integer multiples of the frequency of the input signal.

Figure 4:
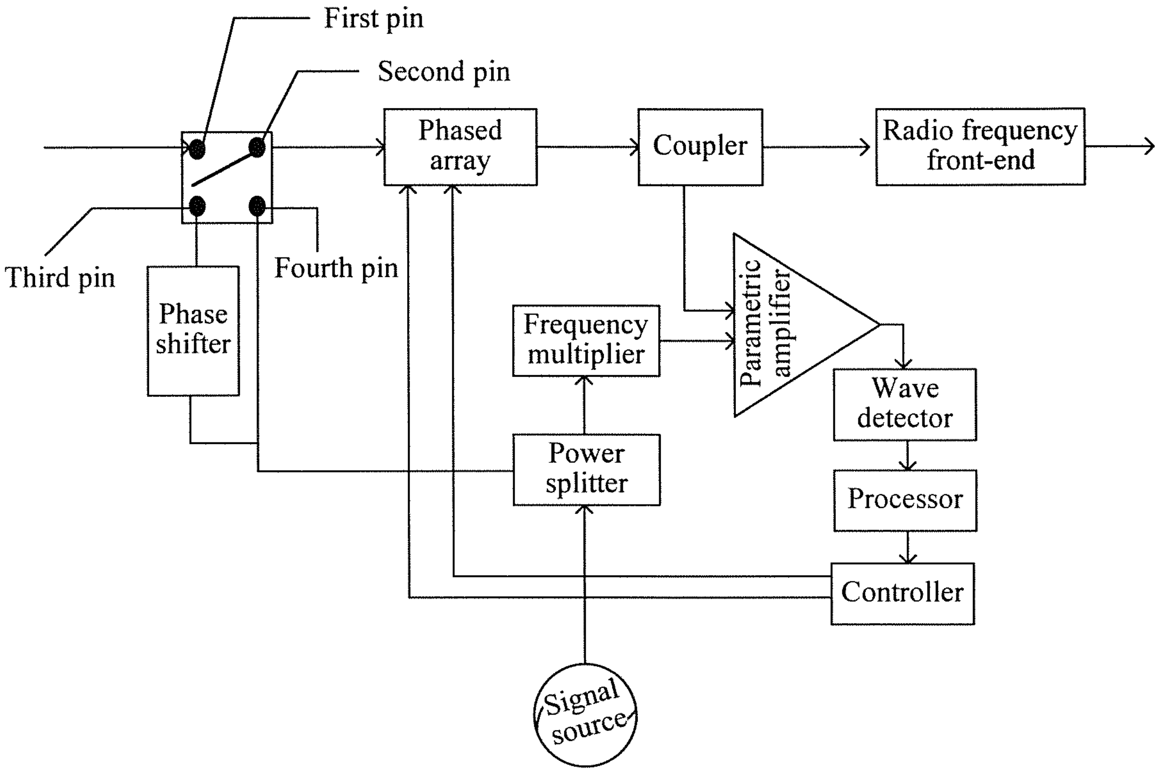
FIG. 4 is a first phased array calibration circuit according to Embodiment 1 of the present invention.

As shown in FIG. 4, FIG. 4 is a first implementation circuit of a phased array calibration circuit provided in this embodiment of the present invention. The selector is a single-pole, three-throw switch, and the phase difference module is a phase shifter. The single-pole, three-throw switch includes a first pin, a second pin, a third pin, and a fourth pin, and the phase shifter includes an input end and an output end. A manner of connection to the signal obtaining module is shown in the figure and may be described as follows: the first pin is connected to a radio frequency input end, the second pin is connected to the phased array, the third pin is connected to the input end of the phase shifter, and the fourth pin is connected to the second output end of the power splitter; the output end of the phase shifter is connected to the second output end of the power splitter.

When the single-pole, three-throw switch is thrown to the first pin, the phased array circuit is in a working state, that is, only the main signal module in the circuit is switched on. Due to factors such as an ambient temperature and device aging, phase information and amplitude information of a main channel signal that are recorded by the phased array have an error. Therefore, the phased array needs to be calibrated. When the single-pole, three-throw switch is thrown to the third pin, the signal obtaining module and the main signal module are switched on. The initial signal passes through the power splitter and is divided into two signals, where one signal passes through the frequency multiplier and then enters the parametric amplifier, and the other signal passes through the phased array, enters the coupler, and then enters the parametric amplifier. Herein, affected by the error of the phased array, a phase of a signal coming out of the coupler is shifted. A signal output from the parametric amplifier enters the wave detector, the controller, and the processor successively. Finally, two signals are obtained at the output end of the controller or the processor, where one signal is an amplitude signal, and the other signal is a phase signal. Herein, when the signal passes through the processor, the processor records a gain of the signal and amplitude information of the signal. In this way, first phase information and first amplitude information of the first signal are obtained, that is, information about a shifted phase of the first signal under the effect of the error of the phased array channel. In addition, the amplitude signal enters a corresponding amplitude information extraction module of the phased array, and the phase signal enters a corresponding phase information extraction module of the phased array. In this way, the phased array can implement extraction of the phase information and amplitude information of the signal. When the single-pole, three-throw switch is thrown to the fourth pin, the signal obtaining module, the phase difference module, and the main signal module are switched on. The initial signal passes through the power splitter and is divided into two signals, where one signal passes through the frequency multiplier and then enters the parametric amplifier, and the other signal passes through the phase shifter, enters the phased array, then enters the coupler, and finally enters the parametric amplifier. Herein, affected by the error of the phased array, a phase of a signal coming out of the coupler is shifted. A signal output from the parametric amplifier enters the wave detector, the processor, and the controller successively. Finally, two signals are obtained at the output end of the controller, where one signal is an amplitude signal, and the other signal is a phase signal. Herein, when the signal passes through the processor, the processor records a gain of the signal and amplitude information of the signal. In this way, first phase information and first amplitude information of the second signal are obtained, that is, information about a shifted phase of the second signal under the effect of the error of the phased array channel. In this way, link gains, that is, amplitude information, corresponding to the first signal and the second signal are recorded in the processor. The gain increment may be obtained according to the amplitude information of the first signal and the amplitude information of the second signal, and then, by searching for an entry corresponding to the gain increment in the processor, original phase information and original amplitude information of the first signal and original phase information and original amplitude information of the second signal can be obtained. In this way, the phase error of the phased array channel can be obtained according to the first phase information of the first signal and the original phase information of the first signal. The amplitude error of the phased array channel is obtained by means of calculation according to the first amplitude information of the first signal and the original amplitude information of the first signal. Finally, a phase and an amplitude of the main channel signal can be adjusted according to the phase error and the amplitude error.

Figure 5:
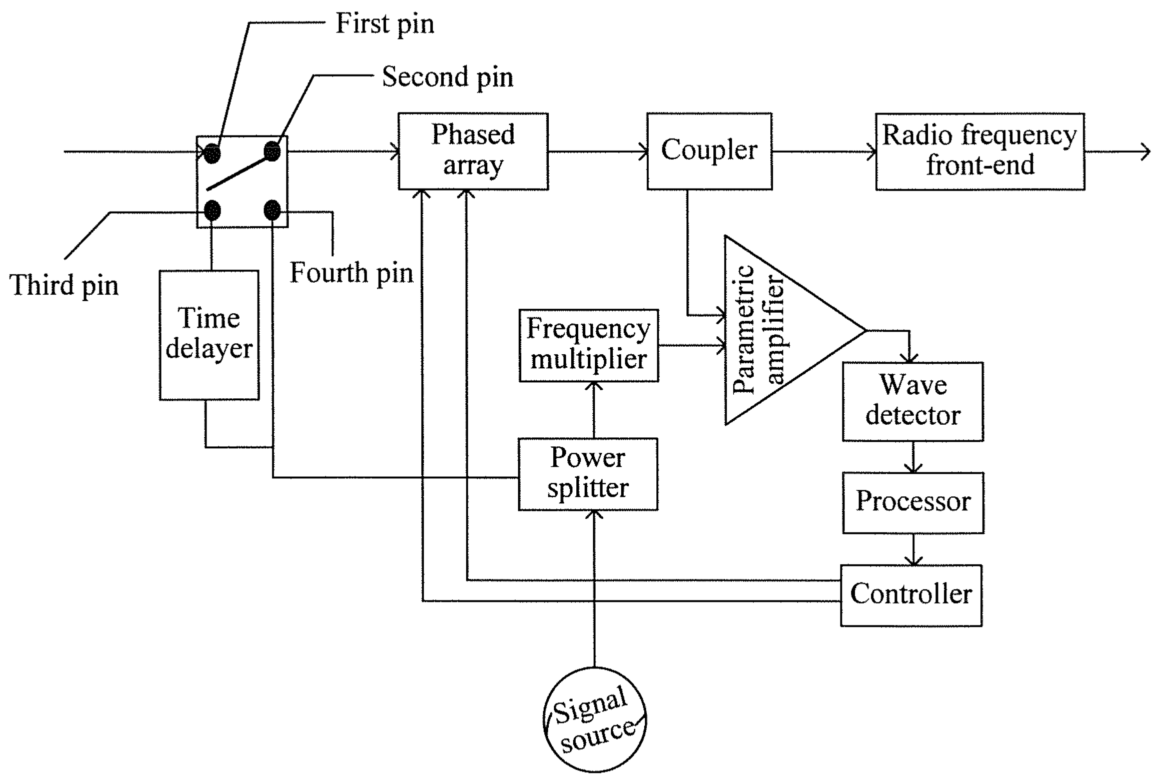
FIG. 5 is a second phased array calibration circuit according to Embodiment 1 of the present invention.

As shown in FIG. 5, FIG. 5 is a second implementation circuit of a phased array calibration circuit provided in this embodiment of the present invention. The selector is a single-pole, three-throw switch, and the phase difference module is a time delayer. The single-pole, three-throw switch includes a first pin, a second pin, a third pin, and a fourth pin, and the time delayer includes an input end and an output end. A manner of connection to the signal obtaining module is shown in the figure and may be described as follows: the first pin is connected to a radio frequency input end, the second pin is connected to the phased array, the third pin is connected to the input end of the time delayer, and the fourth pin is connected to the second output end of the power splitter; the output end of the time delayer is connected to the second output end of the power splitter. A fixed end of the single-pole, double-throw switch is connected to the second pin.

When the single-pole, three-throw switch is thrown to the first pin, the phased array circuit is in a working state, that is, only the main signal module in the circuit is switched on. When a main channel signal passes through the phased array, the phased array records phase information and amplitude information of the main channel signal. Due to factors such as an ambient temperature and device aging, the phase information and the amplitude information of the main channel signal that are recorded by the phased array have an error. Therefore, the phased array needs to be calibrated. When the single-pole, three-throw switch is thrown to the third pin, the signal obtaining module and the main signal module are switched on. The initial signal passes through the power splitter and is divided into two signals, where one signal passes through the frequency multiplier and then enters the parametric amplifier, and the other signal passes through the phased array, enters the coupler, and then enters the parametric amplifier. A signal output from the parametric amplifier enters the wave detector, the processor, and the controller successively; herein, when the signal passes through the processor, the processor records a gain of the signal and amplitude information of the signal. In this way, first phase information and first amplitude information of the first signal are obtained, that is, information about a shifted phase of the first signal under the effect of the error of the phased array channel. Finally, two signals are obtained at the output end of the controller, where one signal is an amplitude signal, and the other signal is a phase signal. The amplitude signal enters a corresponding amplitude information extraction module of the phased array, and the phase signal enters a corresponding phase information extraction module of the phased array. When the single-pole, three-throw switch is thrown to the fourth pin, the signal obtaining module, the phase difference module, and the main signal module are switched on. The initial signal passes through the power splitter and is divided into two signals. One signal passes through the frequency multiplier and then enters the parametric amplifier. The other signal passes through the time delayer, enters the phased array, then enters the coupler, and finally enters the parametric amplifier, where this signal is phase-shifted under the effect of the error of the phased array channel. A signal output from the parametric amplifier enters the wave detector, the processor, and the controller successively. Finally, two signals are obtained at the output end of the controller/processor, where one signal is an amplitude signal, and the other signal is a phase signal. Herein, when the signal passes through the processor, the processor records a gain of the signal and amplitude information of the signal. In this way, first phase information and first amplitude information of the second signal are obtained, that is, information about a shifted phase of the second signal under the effect of the error of the phased array channel.

In this way, link gains, that is, amplitude information, corresponding to the first signal and the second signal are recorded in the processor. The gain increment may be obtained according to the amplitude information of the first signal and the amplitude information of the second signal, and then, by searching for an entry corresponding to the gain increment in the processor, the original phase information and the original amplitude information of the first signal and the original phase information and the original amplitude information of the second signal can be obtained. In this way, the phase error of the phased array channel can be obtained according to the first amplitude information of the first signal and the original amplitude information of the first signal. The amplitude error of the phased array channel is obtained by means of calculation according to the first amplitude information of the first signal and the original amplitude information of the first signal. Finally, a phase and an amplitude of the main channel signal can be adjusted according to the phase error and the amplitude error.

Figure 6:
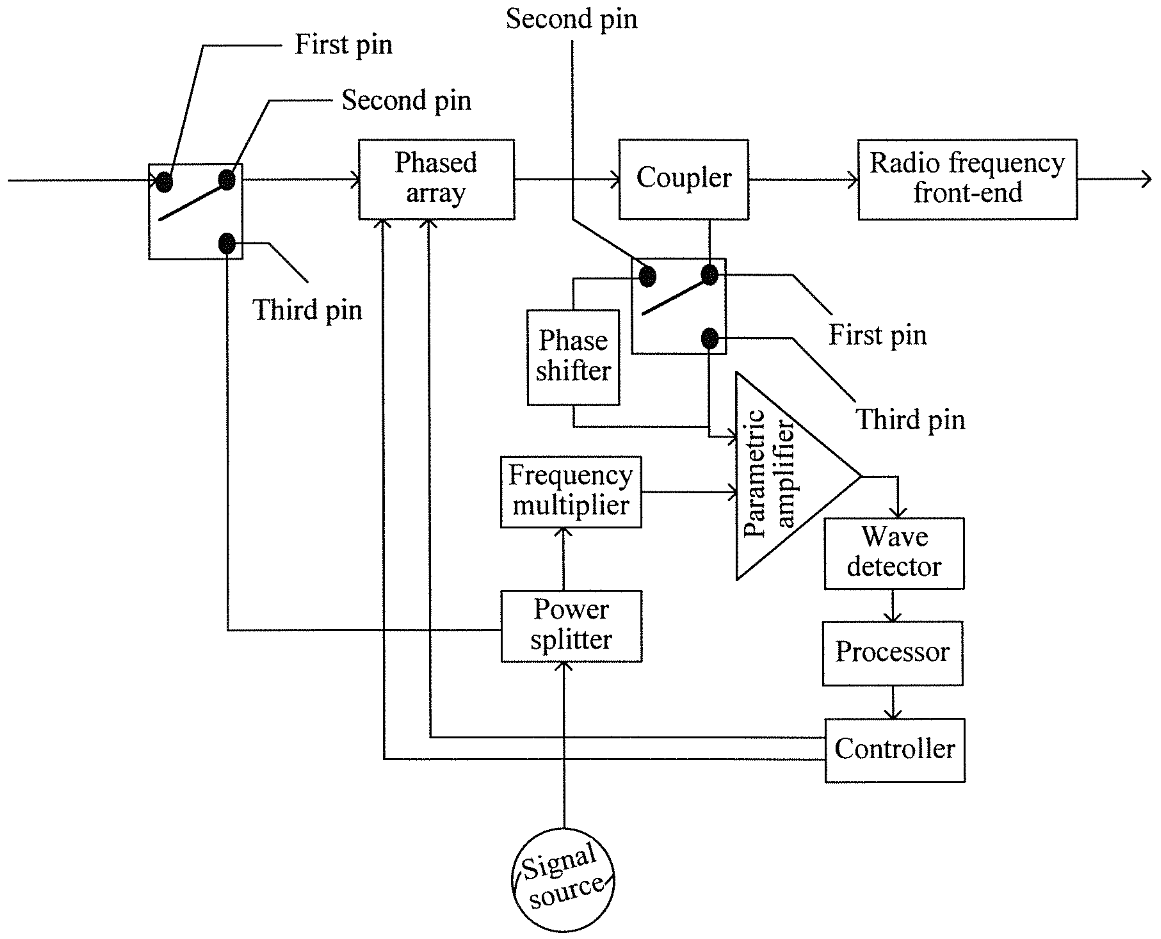
FIG. 6 is a third phased array calibration circuit according to Embodiment 1 of the present invention.

As shown in FIG. 6, FIG. 6 is a third implementation circuit of a phased array calibration circuit provided in this embodiment of the present invention. The selector is a first single-pole, double-throw switch, and the phase difference module includes a phase shifter and a second single-pole, double-throw switch. A connection manner of the main signal module, the signal obtaining module and the phase difference module is shown in the figure and may be described as follows: a first pin of the first single-pole, double-throw switch is connected to a radio frequency input end, a second pin of the first single-pole, double-throw switch is connected to an input end of the phased array, and a third pin of the first single-pole, double-throw switch is connected to the second output end of the power splitter; a first pin of the second single-pole, double-throw switch is connected to the coupler, a second pin of the second single-pole, double-throw switch is connected to the phase shifter, and a third pin of the second single-pole, double-throw switch is connected to the second input end of the parametric amplifier; an output end of the phase shifter is connected to the second input end of the parametric amplifier.

When the first single-pole, double-throw switch is thrown to the first pin, the phased array circuit is in a working state, that is, the main signal module is switched on. When a main channel signal passes through the phased array, the phased array records phase information and amplitude information of the main channel signal. Due to factors such as an ambient temperature and device aging, the phase information and the amplitude information of the main channel signal that are recorded by the phased array have an error. Therefore, the phased array needs to be calibrated. When the first single-pole, double-throw switch is thrown to the third pin, and the second single-pole, double-throw switch is thrown to the third pin, the signal obtaining module and the main signal module are switched on. The initial signal passes through the power splitter and is divided into two signals, where one signal passes through the frequency multiplier and then enters the parametric amplifier, and the other signal passes through the phased array, enters the coupler, and then enters the parametric amplifier. When the signal passes through the phased array, a phase of the signal is shifted under the effect of the error of the phased array channel. A signal output from the parametric amplifier enters the wave detector, the processor, and the controller successively. Finally, a phase signal and an amplitude signal are obtained at the output end of the controller. Herein, the processor records first amplitude information and first phase information of the first signal. When the first single-pole, double-throw switch is thrown to the third pin, and the second single-pole, double-throw switch is thrown to the second pin, the main signal module, the signal obtaining module, and the phase difference module are switched on. The initial signal passes through the power splitter and is divided into two signals, where one signal passes through the frequency multiplier and then enters the parametric amplifier, and the other signal passes through the phased array and the coupler, then passes through the phase shifter, and finally enters the parametric amplifier. Similarly, a phase of the signal is also shifted under the effect of the error of the phased array channel. A signal output from the parametric amplifier enters the wave detector, the processor, and the controller successively. Finally, two signals are obtained at the output end of the controller. The processor records first phase information and first amplitude information of the second signal.

In this way, link gains, that is, amplitude info/nation, corresponding to the first signal and the second signal are recorded in the processor. The gain increment may be obtained according to the amplitude information of the first signal and the amplitude information of the second signal, and then, by searching for an entry corresponding to the gain increment in the processor, the original phase information and the original amplitude information of the first signal and the original phase information and the original amplitude information of the second signal can be obtained. The phase error of the phased array channel may be obtained according to the first amplitude information of the first signal and the original amplitude information of the first signal. The amplitude error of the phased array channel is obtained by means of calculation according to the first amplitude information of the first signal and the original amplitude information of the first signal. Finally, a phase and an amplitude of the main channel signal can be adjusted according to the phase error and the amplitude error.

Figure 7:
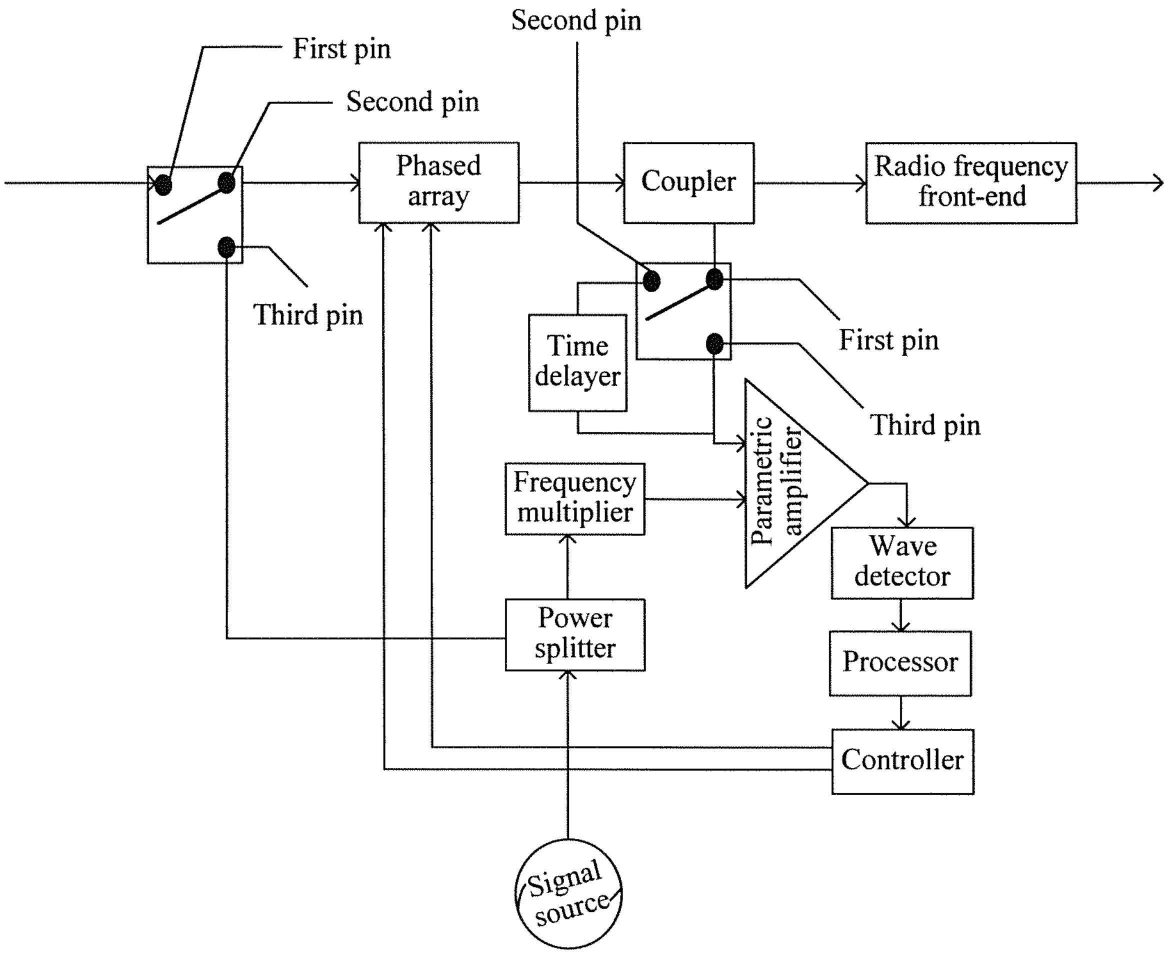
FIG. 7 is a fourth phased array calibration circuit according to Embodiment 1 of the present invention.

As shown in FIG. 7, FIG. 7 is a fourth implementation circuit of a phased array calibration circuit provided in this embodiment of the present invention. The selector is a first single-pole, double-throw switch, and the phase difference module includes a time delayer and a second single-pole, double-throw switch. A connection manner of the main signal module, the signal obtaining module, and the phase difference module is shown in the figure and may be described as follows: a first pin of the first single-pole, double-throw switch is connected to a radio frequency input end, a first pin of the second single-pole, double-throw switch is connected to the input end of the phased array, and a third pin of the first single-pole, double-throw switch is connected to the second output end of the power splitter; the first pin of the second single-pole, double-throw switch is connected to the coupler, a second pin of the second single-pole, double-throw switch is connected to the time delayer, and a third pin of the second single-pole, double-throw switch is connected to the second input end of the parametric amplifier; an output end of the time delayer is connected to the second input end of the parametric amplifier.

When the first single-pole, double-throw switch is thrown to the first pin, the phased array circuit is in a working state, that is, the main signal module is switched on. When a main signal passes through the phased array, the phased array records phase information and amplitude information of the main channel signal. Due to factors such as an ambient temperature and device aging, the phase information and the amplitude information of the main channel signal that are recorded by the phased array have an error. Therefore, the phased array needs to be calibrated. When the first single-pole, double-throw switch is thrown to the third pin, and the second single-pole, double-throw switch is thrown to the third pin, the signal obtaining module and the main signal module are switched on. The initial signal passes through the power splitter and is divided into two signals, where one signal passes through the frequency multiplier and then enters the parametric amplifier, and the other signal passes through the phased array, enters the coupler, and then enters the parametric amplifier. A signal output from the parametric amplifier enters the wave detector, the processor, and the controller successively. Finally, two signals are obtained at the output end of the controller, where one signal is an amplitude signal, and the other signal is a phase signal. In addition, the processor records first phase information and first amplitude information of the first signal. The amplitude signal enters a corresponding amplitude information extraction module of the phased array, and the phase signal enters a corresponding phase information extraction module of the phased array. When the first single-pole, double-throw switch is thrown to the third pin, and the second single-pole, double-throw switch is thrown to the second pin, the signal obtaining module and the phase difference module are switched on. The initial signal passes through the power splitter and is divided into two signals, where one signal passes through the frequency multiplier and then enters the parametric amplifier, and the other signal passes through the phased array and the coupler, then passes through the time delayer, and finally enters the parametric amplifier. A signal output from the parametric amplifier enters the wave detector, the processor, and the controller successively. Finally, two signals are obtained at the output end of the controller. Similarly, the processor also records first phase information and first amplitude information of the second signal.

In this way, link gains, that is, amplitude information, corresponding to the first signal and the second signal are recorded in the processor. The gain increment may be obtained according to the amplitude information of the first signal and the amplitude information of the second signal, and then, by searching for an entry corresponding to the gain increment in the processor, the original phase information and the original amplitude information of the first signal and the original phase information and the original amplitude information of the second signal can be obtained. In this way, the phase error of the phased array channel can be obtained according to the first amplitude information of the first signal and the original amplitude information of the first signal. The amplitude error of the phased array channel is obtained by means of calculation according to the first amplitude information of the first signal and the original amplitude information of the first signal. Finally, a phase and an amplitude of the main channel signal can be adjusted according to the phase error and the amplitude error.

The phased array calibration circuit provided in the present invention can be applied to calibration of a large-scale phased array. Extraction of an amplitude error and a phase error of the phased array is implemented based on a parametric amplifier, so as to calibrate and recover a main channel signal in a relatively accurate manner. Compared with a calibration circuit in the prior art, the calibration circuit provided in the present invention has a lower circuit complexity degree, is simple and is easy to implement, and has relatively low costs.

Embodiment 2

Figure 8:
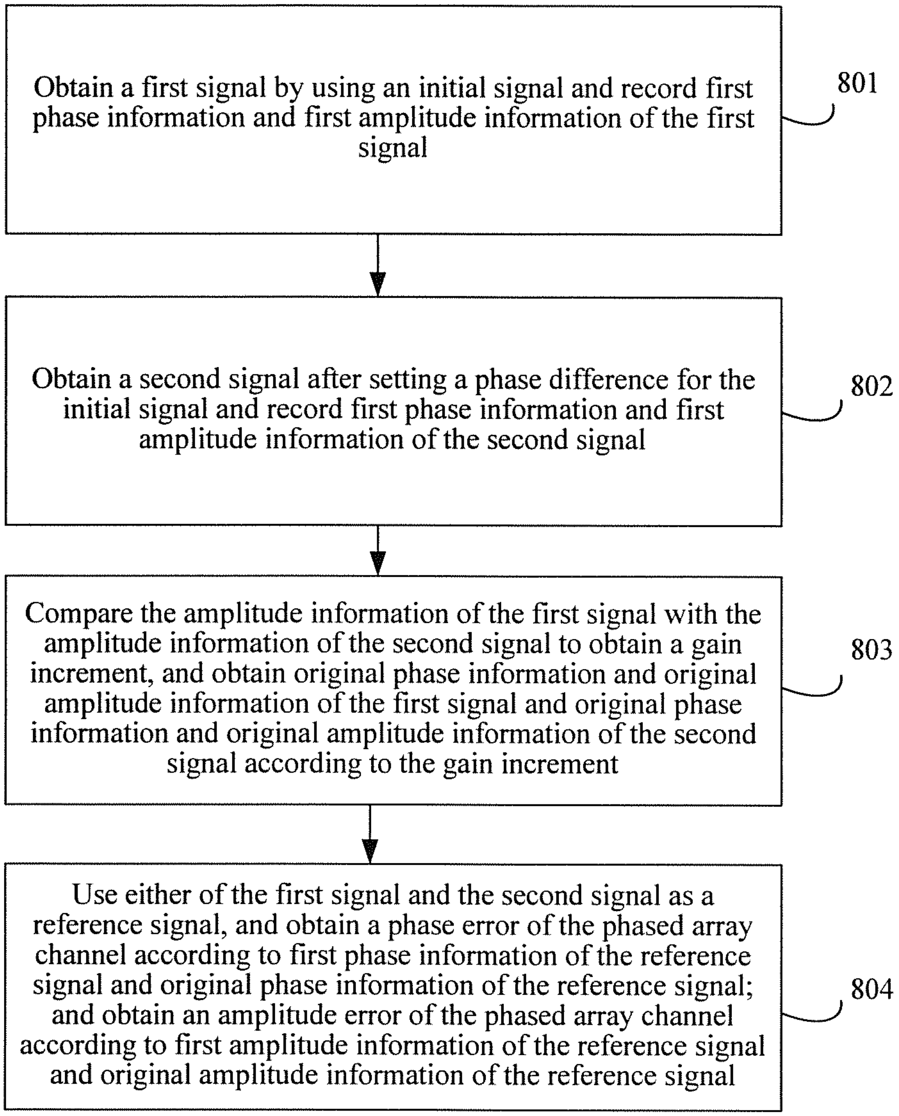
FIG. 8 is a schematic flowchart of a phased array calibration method according to Embodiment 2 of the present invention.

This embodiment of the present invention provides a phased array calibration method, as shown in FIG. 8, and the method includes the following steps:

801: Obtain a first signal by using an initial signal and record first phase information and first amplitude information of the first signal.

The present invention implements extraction of an error of a phased array on the basis of a parametric amplifier because a gain increment (that is, a gain difference between two signals) of the parametric amplifier uniquely corresponds to two gain values, and the two gain values each correspond to one piece of phase information. In addition, a processor in a circuit is used to record first phase information and first amplitude information of the first signal, that is, phase information of the signal that is phase-shifted after passing through a phased array. In specific implementation, a first sub-signal and a second sub-signal are obtained by using the initial signal, where a sum of powers of the first sub-signal and the second sub-signal is equal to a power of the initial signal. A third sub-signal is obtained after frequency multiplication processing is performed on the first sub-signal; after the second sub-signal enters the phased array channel, a fourth sub-signal is obtained by means of sampling; the third sub-signal and the fourth sub-signal are used as an input of the parametric amplifier; and amplitude strength extraction processing is performed on an output signal of the parametric amplifier, and an obtained signal is used as the first signal. The output signal of the parametric amplifier passes through the processor, and the processor can record the first phase information and the first amplitude information of the first signal.

802: Obtain a second signal after setting a phase difference for the initial signal and record first phase information and first amplitude information of the second signal.

When the second signal is obtained by using the initial signal, a phase shifter (a time delayer) is also used in addition to the parametric amplifier. In specific implementation, the first sub-signal and the second sub-signal are obtained by using the initial signal; a third sub-signal is obtained after a frequency of the first sub-signal is multiplied, and a fifth sub-signal is obtained by means of sampling after a phase shift (or a time delay) is set for the second sub-signal. The third sub-signal and the fifth sub-signal are used as an input of the parametric amplifier. Amplitude strength extraction processing is performed on an output signal of the parametric amplifier, and an obtained signal is used as the second signal.

In addition, the present invention further provides another method for obtaining the second signal. In specific implementation, the first sub-signal and the second sub-signal are obtained by using the initial signal. After a frequency of the first sub-signal is multiplied, the third sub-signal is obtained, and a seventh sub-signal is obtained by means of sampling after a phase shift (or a time delay) is set for the second sub-signal. The third sub-signal and the seventh sub-signal are used as an input of the parametric amplifier. Amplitude strength extraction processing is performed on an output signal of the parametric amplifier, and an obtained signal is used as the second signal.

803: Compare the amplitude information of the first signal with the amplitude information of the second signal to obtain a gain increment, and obtain original phase information and original amplitude information of the first signal and original phase information and original amplitude information of the second signal according to the gain increment.

Herein, because of special attributes of the parametric multiplier, one gain increment uniquely corresponds to two gain values, and the two gain values each correspond to one piece of phase information. Therefore, according to the gain increment of the first signal and the second signal (a difference between the first amplitude information of the first signal and the first amplitude information of the second signal), an entry corresponding to the gain increment may be searched for in the processor to obtain the original phase information and original amplitude information of the first signal and the original phase information and original amplitude information of the second signal.

804: Use either of the first signal and the second signal as a reference signal, and obtain a phase error of the phased array channel according to first phase information of the reference signal and original phase information of the reference signal; and obtain an amplitude error of the phased array channel according to first amplitude information of the reference signal and original amplitude information of the reference signal.

Herein, either of the first signal and the second signal may be selected for calculation to obtain the phase error and the amplitude error of the phased array channel. An accurate error of the phased array can be obtained by means of calculation with reference to the corresponding original phase information and amplitude information. In addition, a calibration signal is output according to the phase error of the phased array channel and the amplitude error of the phased array channel, to calibrate a phase and an amplitude of a main channel signal.

The phased array calibration method provided in the present invention can be applied to calibration of a large-scale phased array. Extraction of an amplitude error and a phase error of the phased array is implemented based on a parametric amplifier, so as to calibrate and recover a main channel signal in a relatively accurate manner. Compared with a calibration method in the prior art, the calibration method provided in the present invention has a lower circuit complexity degree, is simple and is easy to implement, and has relatively low costs.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM (Read Only Memory), a RAM (Randomly Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A phased array calibration circuit, comprising:

a signal obtaining module;

a phase difference module;

a main signal module; and a selector configured to switch on the signal obtaining module, the main signal module and the phase difference module, wherein the signal obtaining module is configured to:

obtain a first signal according to an initial signal after the selector switches on the signal obtaining module and the main signal module, and obtain a second signal according to the initial signal after the selector switches on the phase difference module, the signal obtaining module, and the main signal module, so as to obtain a phase error and an amplitude error of a phased array channel in the main signal module according to phase information and amplitude information of the first signal and phase information and amplitude information of the second signal;

wherein the main signal module comprises: a phased array, a coupler, and a radio frequency front-end;

wherein the signal obtaining module comprises: a parametric amplifier, a wave detector, a processor, a controller, a signal generator, a power splitter, and a frequency multiplier; and wherein:

the signal generator comprises a signal output end connected to an input end of the power splitter;

the power splitter comprises a first output end and a second output end, the first output end is connected to an input end of the frequency multiplier, the parametric amplifier comprises a first input end, a second input end, and an output end, and wherein the first input end is connected to an output end of the frequency multiplier, and the output end of the parametric amplifier is connected to an input end of the wave detector;

an input end of the processor is connected to an output end of the wave detector, an output end of the processor is connected to an input end of the controller, an output end of the controller is connected to the phased array, the phased array is connected to an input end of the coupler, an output end of the coupler is connected to an input end of the radio frequency front-end, and an output end of the radio frequency front-end is an output end of the main signal module.

2. The phased array calibration circuit according to claim 1, wherein:

the phase difference module is a phase shifter having an output end connected to the second output end of the power splitter; and the selector is a single-pole, three-throw switch comprising a first pin, a second pin, a third pin, and a fourth pin, wherein the first pin is connected to the radio frequency input end, the second pin is connected to the phased array, the third pin is connected to an input end of the phase shifter, and the fourth pin is connected to the second output end of the power splitter.

3. The phased array calibration circuit according to claim 1, wherein:

the phase difference module is a time delayer; and the selector is a single-pole, three-throw switch comprising a first pin, a second pin, a third pin, and a fourth pin, wherein the first pin is connected to the radio frequency input end, the second pin is connected to the phased array, the third pin is connected to an input end of the time delayer, and the fourth pin is connected to the second output end of the power splitter.

4. The phased array calibration circuit according to claim 1, wherein:

the selector is a first single-pole, double-throw switch; and the phase difference module comprises a phase shifter and a second single-pole, double-throw switch, wherein:

a first pin of the first single-pole, double-throw switch is connected to a radio frequency input end, a first pin of the second single-pole, double-throw switch is connected to the phased array, and a third pin of the first single-pole, double-throw switch is connected to the second output end of the power splitter, the first pin of the second single-pole, double-throw switch is connected to the coupler, a second pin of the second single-pole, double-throw switch is connected to the phase shifter, and a third pin of the second single-pole, double-throw switch is connected to the second input end of the parametric amplifier, and an output end of the phase shifter is connected to the second input end of the parametric amplifier.

5. The phased array calibration circuit according to claim 1, wherein:

the selector is a first single-pole, double-throw switch; and the phase difference module comprises a time delayer and a second single-pole, double-throw switch, wherein:

a first pin of the first single-pole, double-throw switch is connected to a radio frequency input end, a first pin of the second single-pole, double-throw switch is connected to the phased array, and a third pin of the first single-pole, double-throw switch is connected to the second output end of the power splitter, the first pin of the second single-pole, double-throw switch is connected to the coupler, a second pin of the second single-pole, double-throw switch is connected to the time delayer, and a third pin of the second single-pole, double-throw switch is connected to the second input end of the parametric amplifier, and an output end of the time delayer is connected to the second input end of the parametric amplifier.

6. A phased array calibration method for use in a circuit that implements phased array calibration by using a parametric amplifier, wherein a gain increment of the parametric amplifier uniquely corresponds to two gain values and two phase values, the method comprising:

obtaining a first signal by using an initial signal and recording first phase information and first amplitude information of the first signal;

obtaining a second signal after setting a phase difference for the initial signal, and recording first phase information and first amplitude information of the second signal;

comparing the amplitude information of the first signal with the amplitude information of the second signal to obtain a gain increment, and obtaining original phase information and original amplitude information of the first signal and original phase information and original amplitude information of the second signal according to the gain increment;

using either of the first signal and the second signal as a reference signal, and obtaining a phase error of a phased array channel according to first phase information of the reference signal and original phase information of the reference signal; and obtaining an amplitude error of the phased array channel according to first amplitude information of the reference signal and original amplitude information of the reference signal, wherein obtaining a first signal by using an initial signal comprises:

obtaining a first sub-signal and a second sub-signal by using the initial signal, wherein a sum of powers of the first sub-signal and the second sub-signal is equal to a power of the initial signal;

obtaining a third sub-signal after performing frequency multiplication processing on the first sub-signal, obtaining a fourth sub-signal by means of sampling after the second sub-signal enters the phased array channel, and using the third sub-signal and the fourth sub-signal as an input of the parametric amplifier; and performing amplitude strength extraction processing on an output signal of the parametric amplifier and using an obtained signal as the first signal.

7. The method according to claim 6, further comprising: outputting a calibration signal according to the phase error of the phased array channel and the amplitude error of the phased array channel to calibrate a phase and an amplitude of a main channel signal.

8. The method according to claim 6, wherein obtaining a second signal after setting a phase difference for the initial signal comprises:

setting a time delay for the second sub-signal, and after the second sub-signal enters the phased array channel, sampling an output signal of the phased array channel to obtain a fifth sub-signal;

using the third sub-signal and the fifth sub-signal as an input of the parametric amplifier; and performing amplitude strength extraction processing on an output signal of the parametric amplifier and using an obtained signal as the second signal.

9. The method according to claim 6, wherein obtaining a second signal after setting a phase difference for the initial signal comprises:

setting a phase shift for the second sub-signal, and after the second sub-signal enters the phased array channel, sampling an output signal of the phased array channel to obtain a fifth sub-signal;

using the third sub-signal and the fifth sub-signal as an input of the parametric amplifier; and performing amplitude strength extraction processing on an output signal of the parametric amplifier and using an obtained signal as the second signal.

10. The method according to claim 6, wherein obtaining a second signal after setting a phase difference for the initial signal comprises:

after the second sub-signal enters the phased array channel, performing sampling, and setting a time delay for a signal obtained after sampling to obtain a seventh sub-signal;

using the third sub-signal and the seventh sub-signal as an input of the parametric amplifier; and performing amplitude strength extraction processing on an output signal of the parametric amplifier and using an obtained signal as the second signal.

11. The method according to claim 6, wherein obtaining a second signal after setting a phase difference for the initial signal comprises:

after the second sub-signal enters the phased array channel, performing sampling, and setting a phase shift for a signal obtained after sampling to obtain an eighth sub-signal;

using the third sub-signal and the eighth sub-signal as an input of the parametric amplifier; and performing amplitude strength extraction processing on an output signal of the parametric amplifier and using an obtained signal as the second signal.

* * * * *